United States Patent
Hu

(10) Patent No.: US 9,582,082 B2
(45) Date of Patent: Feb. 28, 2017

(54) METHOD AND APPARATUS FOR DISPLAYING CHARACTER SELECTION DURING USER INPUT

(75) Inventor: Jiachao Hu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 13/129,872

(22) PCT Filed: Jan. 14, 2011

(86) PCT No.: PCT/US2011/021346
§ 371 (c)(1),
(2), (4) Date: May 18, 2011

(87) PCT Pub. No.: WO2011/112276
PCT Pub. Date: Sep. 15, 2011

(65) Prior Publication Data
US 2012/0320064 A1    Dec. 20, 2012

(30) Foreign Application Priority Data

Mar. 9, 2010    (CN) .......................... 2010 1 0122132

(51) Int. Cl.
*G06K 3/00*    (2006.01)
*G06K 5/00*    (2006.01)
*G06K 9/00*    (2006.01)
*G06F 3/023*    (2006.01)
*G06F 3/01*    (2006.01)

(52) U.S. Cl.
CPC ............ *G06F 3/0236* (2013.01); *G06F 3/013* (2013.01); *G06F 3/0237* (2013.01)

(58) Field of Classification Search
USPC ........... 345/467, 473; 382/181–185; 715/863
See application file for complete search history.

(56) References Cited

U.S. PATENT DOCUMENTS 4,531,119 A    7/1985    Nakayama et al.
4,972,496 A *  11/1990   Sklarew ........................ 382/187
(Continued)

FOREIGN PATENT DOCUMENTS

EP    1544719    6/2005
JP    2003196009    7/2003
(Continued)

OTHER PUBLICATIONS

PCT Intl Search Report and Written Opinion for Application No. PCT/US11/21346, mailed Mar. 21, 2011, 7 pgs.
(Continued)

*Primary Examiner* — Ryan R Yang

(57) ABSTRACT

The present disclosure describes a method and apparatus for displaying character selection during a user input process. A method of displaying character selection during a user input process comprises: determining a character entry area; receiving one or more original characters from a user via the character entry area; identifying a plurality of character choices corresponding to the one or more original characters; determining a character selection area based on an optimal viewpoint range centered around the character entry area; and displaying the character choices in the character selection area.

20 Claims, 4 Drawing Sheets

CHARACTER SELECTION AREA      CHARACTER ENTRY AREA      CHARACTER DISPLAY BOX

(56) References Cited

U.S. PATENT DOCUMENTS

| | | | |
|---|---|---|---|
| 6,002,390 | A | 12/1999 | Masui |
| 6,144,378 | A * | 11/2000 | Lee .............................. 715/767 |
| 6,353,529 | B1 * | 3/2002 | Cies ......................... 361/679.05 |
| 6,469,719 | B1 * | 10/2002 | Kino et al. .................... 715/810 |
| 6,744,423 | B2 | 6/2004 | Kraft et al. |
| 6,795,579 | B2 | 9/2004 | Tang et al. |
| 6,967,651 | B2 * | 11/2005 | Endoh et al. ................. 345/428 |
| 7,013,258 | B1 * | 3/2006 | Su ........................... G06F 3/013 345/171 |
| 7,149,550 | B2 | 12/2006 | Kraft et al. |
| 7,257,528 | B1 * | 8/2007 | Ritchie et al. .................... 704/7 |
| 7,681,124 | B2 * | 3/2010 | Gunn et al. ................... 715/256 |
| 7,802,184 | B1 | 9/2010 | Battilana |
| 7,886,233 | B2 | 2/2011 | Rainisto et al. |
| 2005/0027524 | A1 | 2/2005 | Wu et al. |
| 2005/0264584 | A1 | 12/2005 | Di et al. |
| 2007/0216659 | A1 | 9/2007 | Amineh |
| 2008/0158201 | A1 | 7/2008 | Yoshida |
| 2008/0180283 | A1 | 7/2008 | Nordenhake |
| 2009/0100333 | A1 | 4/2009 | Xiao |
| 2010/0026650 | A1 * | 2/2010 | Srivastava et al. ........... 345/173 |
| 2011/0004849 | A1 | 1/2011 | Oh |

FOREIGN PATENT DOCUMENTS

| | | |
|---|---|---|
| JP | 2004280531 | 10/2004 |
| JP | 2008071073 | 3/2008 |
| JP | 2009530944 | 8/2009 |
| JP | 2011118507 A * | 6/2011 |
| WO | WO03098417 | 11/2003 |
| WO | WO2007009096 | 1/2007 |
| WO | WO2009096760 | 8/2009 |
| WO | WO2009105821 | 9/2009 |

OTHER PUBLICATIONS

The Extended European Search Report mailed Apr. 7, 2014 for European patent application No. 11753737.3, 8 pages.

Japan Ergonomics Society, Ergo-Design Section, Screen Designing Research Team, "Screen Designing and Practical Approach," GUI Designing Guidebook, 2nd Edition, Kaibundo Publishing Co. LTD, Japan, Jan. 10, 1997, pp. 16, 17, 110, and 111.

Takayuki, "Visual Field of Humans and Display," Internet <URL:http://divb.net/old/violasiderea/804.html>, Feb. 24, 2010, Entire Document.

Hod et al., "VDT Syndrome Prevention System by Using Sensors," Proceedings of the 70th National Conference Symposium (4), Interface Computer and Human Society, Information Processing Society of Japan, Mar. 13, 2008, pp. 4-791 to 4-792.

Hatada, "Future Display Seen from the Characteristics of Eyeball Image Formation," Monthly Magazine Display, vol. 9, No. 1, Techno Times Co., Jan. 1, 2003, pp. 47-54.

* cited by examiner

METHOD AND APPARATUS FOR DISPLAYING CHARACTER SELECTION DURING USER INPUT

CROSS REFERENCE TO RELATED PATENT APPLICATIONS

This application is a national stage application of an international patent application PCT/US11/21346, filed Jan. 14, 2011, which claims priority from Chinese Patent Application No. 201010122132.3, filed Mar. 9, 2010, entitled "Method and Apparatus for Displaying Character Selection during User Input," which applications are hereby incorporated in their entirety by reference.

TECHNICAL FIELD

The present disclosure relates to the field of computers and, more particularly, to the method and apparatus for displaying character selection during a user input process.

BACKGROUND

Currently, the most commonly-used methods for displaying a character selection area, which comprises a plurality of characters and/or terms (hereinafter referred to as "character choices") for a user to choose from, display the character selection area either as a vertical array or a horizontal array of character choices. For instance, the commonly-used smart ABC input method for inputting characters/terms displays the character choices in a vertical rectangular area. On the other hand, the commonly-used pinyin (a Romanization system to transcribe Chinese characters/terms based on the pronunciation in Mandarin Chinese) input method for inputting characters/terms displays the character choices in a one-level horizontal rectangular area.

FIG. 1 illustrates a vertical character selection area with the smart ABC input method. After a user enters a pinyin, the characters already chosen by the user are displayed in the box in the upper left-hand corner. During the user input process, the character selection is displayed in a rectangular area, or box, on the right-hand side of the display. In this example, after the pinyin "pin' is entered by the user, the character selection box on the right-hand side displays a list of character choices: "1: pin-1, 2: pin-2, 3: pin-3, 4: pin-4, 5: pin-4, 6: pin-6, 7: pin-7, 8: pin-8, 9: pin-9" (note: each of these Chinese characters is pronounced as "pin" in Mandarin Chinese but the meaning of which is different from that of one another). The next set of character choices can be obtained by the user by clicking on the next page icon. The chosen character is displayed in the box in the upper left-hand corner. Upon choosing one or more desired characters/terms, the user may input the chosen character(s)/term(s) for further processing.

FIG. 2 illustrates a horizontal selection area for inputting characters/terms by the pinyin input method. The pinyin entered by a user is displayed in the box on the upper portion, and the character choices are displayed in the lower box. For example, as illustrated in FIG. 2, after the user enters the pinyin "qian jin" as a term including two Chinese characters, the lower horizontal box displays the following character choices: "1: qian jin-1, 2: qian jin-2, 3: qian jin-3, 4: qian jin-4, 5: qian jin-5" (note: each of these Chinese terms is pronounced as "qian jin" in Mandarin Chinese but the meaning of which is different from that of one another). Of course, the next set of character choices can be obtained by the user by clicking on the next page icon. The user can select the desired character or term with the respective number key representing the desired character or term.

Between the abovementioned vertical and horizontal display of character selection boxes, the human eye tends to move faster horizontally than vertically. Accordingly, the search and selection speed tends to be much faster when the character selection is displayed horizontally. However, whether the display of character selection boxes is horizontal or vertical, when the list of character choices is long it will still take the eye some time to sweep across the displayed characters/terms. Thus, a longer search and selection time tends to result, which may not be conducive for users to speedily select the desired character/term. Ultimately, selection of the desired character/term by a user may not be optimized, and undesirable visual fatigue on the user's part may result as well.

SUMMARY

The present disclosure describes various embodiments of a method and an apparatus for displaying character selection during a user input process. It is believed that the embodiments optimize character selection for user input.

In one aspect, a method of displaying character selection during a user input process is provided. The method comprises: determining a character entry area; receiving one or more original characters from a user via the character entry area; identifying a plurality of character choices corresponding to the one or more original characters; determining a character selection area based on an optimal viewpoint range centered around the character entry area; and displaying the character choices in the character selection area.

In one embodiment, determining the character entry area may comprise, upon receiving the one or more original characters, determine position parameters of the character entry area.

In one embodiment, determining the character selection area may comprise: based on the position parameters of the character entry area, determining the optimal viewpoint range that is centered around the character entry area; and within the optimal viewpoint range, determining an expansion value to determine the character selection area such that the character selection area surrounds the character entry area.

In one embodiment, the expansion value may be determined based on the optimal viewpoint range and a distance between the user's eye and a display screen, the distance being a predetermined distance or one of a plurality of alternative distances chosen by the user.

Alternatively, the expansion value may be based on a number, a size, or the number and size of character choices to be displayed in the character selection such that the size of the character selection area corresponds to the number, size, or number and size of the character choices.

In one embodiment, the position parameters of the character entry area may comprise: center coordinates and radius of the character entry area, or the center coordinates and boundary information of the character entry area.

In one embodiment, identifying a plurality of character choices corresponding to the one or more original characters may comprise: searching a character database for characters related to the one or more original characters entered by the user; and based on correlation between characters stored in the character database and the one or more original characters, identifying the plurality of character choices.

In one embodiment, displaying the character choices in the character selection area may comprise: comparing a number of characters displayable in the character selection area and a number of character choices; in an event that the number of character choices to be displayed is no greater than the number of characters displayable in the character selection area, displaying the character choices in a predetermined order in the character selection area; and in an event that the number of character choices to be displayed is greater than the number of characters displayable in the character selection area, displaying the character choices in a predetermined order in a plurality of pages depending on the number of characters displayable in the character selection area.

In one embodiment, displaying the character choices in the character selection area may comprise displaying the character choices in an order based on a priority level according to a frequency of usage of each character choice.

In one embodiment, displaying the character choices in the character selection area may comprise displaying the character choices in different color tones to indicate differences in priority level of the character choices, relevance of the character choices to the one or more original characters, or both differences in priority level of the character choices and relevance of the character choices to the one or more original characters.

In one embodiment, a point near a character entry point of the character entry area may be a starting point for an arrangement of the character choices displayed in different color tones.

In another aspect, an apparatus that displays character selection in a user input process is provided. The apparatus comprises: an acquisition module that receives one or more original characters entered by a user and determines a character entry area where the user enters the one or more original characters; a character determination module that identifies character choices corresponding to the one or more original characters; an area determination module that determines a character display area for displaying the character choices for the user to choose from using the determined character entry area as a center point of an optimal viewpoint for the human eye; and a character display module that displays the character choices in the character selection area.

In one embodiment, the character display module may comprise: a comparison unit that compares a number of characters displayable in the character selection area and a number of the character choices to be displayed; a first display unit that displays the character choices according to a predetermined order in an event that the number of the character choices to be displayed is no greater than the number of characters displayable in the character selection area; and a second display unit that displays the character choices on a plurality of pages in a predetermined order, according to the number of characters displayable in the character selection area, in an event that the number of the character choices to be displayed is greater than the number of characters displayable in the character selection area.

In one embodiment, the character display module may further comprise: a priority level determination unit that determines a respective priority level of each character choice based on how often each character choice is used, and notifies the first display unit or the second display unit such that the first display unit or the second display unit displays the character choices based on the priority levels of the character choices.

In one embodiment, the area determination module may comprise: a parameter acquisition unit that obtains information related to a position of the character entry area, the information related to the position of the character entry area including: center coordinates and radius of the character entry area, or the center coordinates and boundary information of the character entry area; and an area determination unit that, using the information related to the position of the character entry area, determines the character selection area with the character entry area as the center for optimal viewpoint for a human eye, and determines an expansion value to form the character selection area surrounding the character entry area.

In one embodiment, the expansion value may be determined based on the optimal viewpoint range and a distance between the user's eye and a display screen, the distance being a predetermined distance or one of a plurality of alternative distances chosen by the user.

Alternatively, the expansion value may be based on a number, a size, or the number and size of character choices to be displayed in the character selection such that the size of the character selection area corresponds to the number, size, or number and size of the character choices.

The present disclosure provides a method and apparatus for displaying character selection. The character entry area for a user to enter one or more original characters is determined for receiving one or more original characters from the user. Character choices corresponding to the one or more original characters entered by the user are determined. A character selection area within an optimal viewpoint range with the character entry area as the center is determined and displays the character choices for the user to choose from. The disclosed technique displays the character choices within an optimal viewpoint range of the human eye. This reduces the amount as well as frequency of eyeball movement in selecting the character choices, and thereby increases the selection speed and efficacy. In short, the disclosed techniques optimize the speed and efficiency of the character selection process.

DETAILED DESCRIPTION

Figure 1:
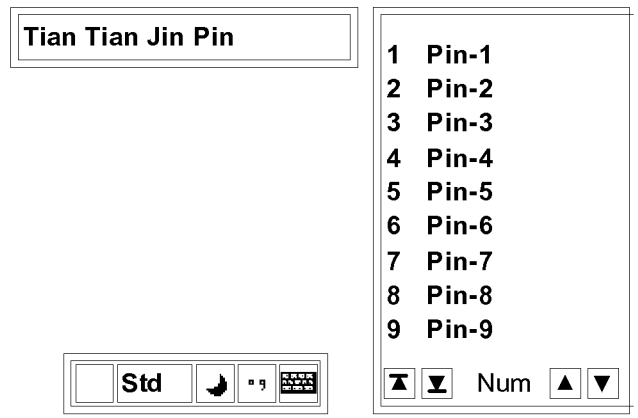
FIG. 1 shows a diagram of a vertical display of a character selection area with existing technologies.
Figure 2:
FIG. 2 shows a diagram of a horizontal display of a character selection area with existing technologies.
Figure 3:
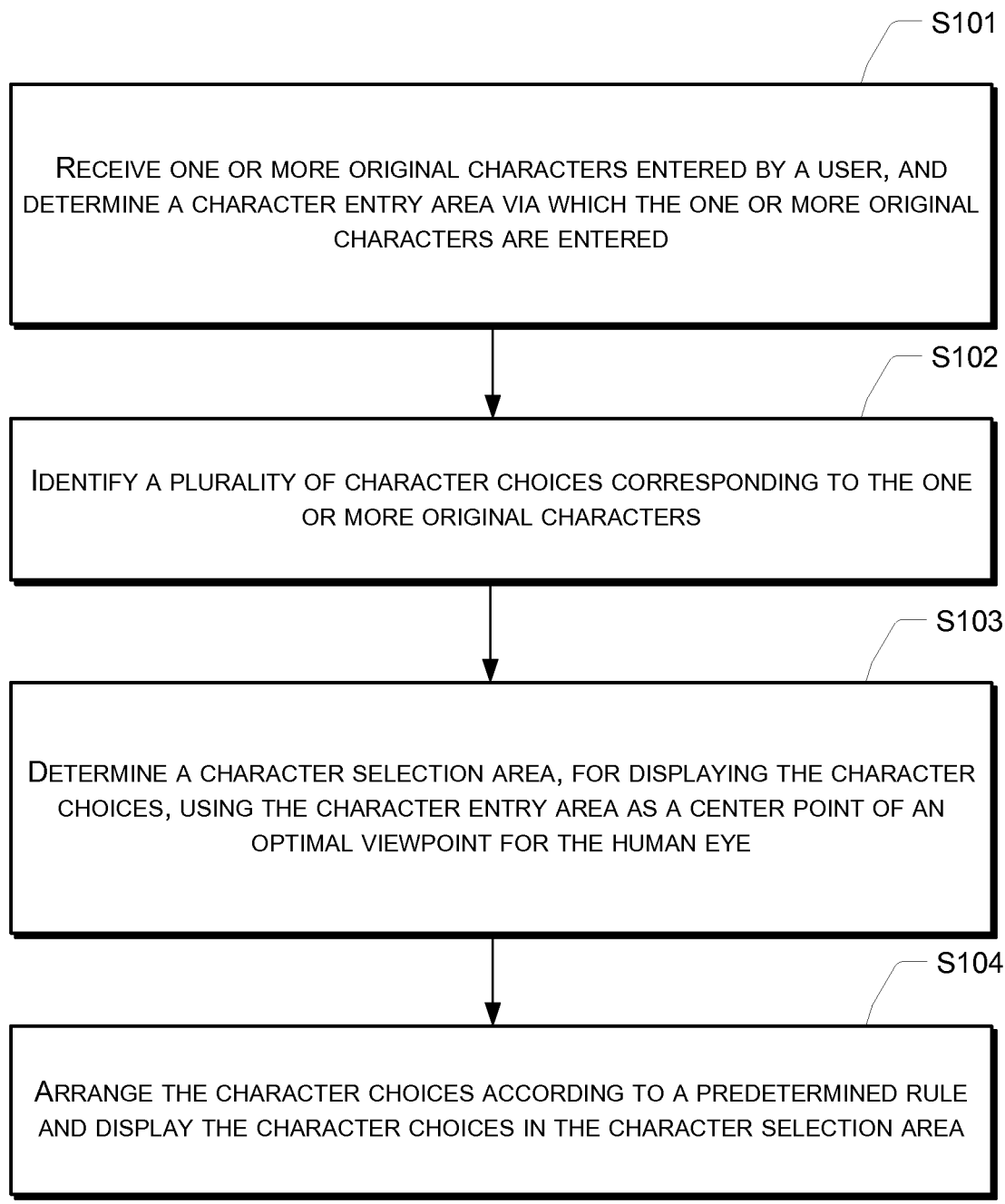
FIG. 3 shows a flowchart of a method of displaying a character selection area for user input according to an embodiment of the present disclosure.

The present disclosure provides various embodiments of a method for displaying a character selection area, comprising a plurality of characters and/or terms (hereinafter referred to as "character choices") for a user to choose from. The character choices are displayed within an area more appropriate for the human eye, and therefore the speed and efficiency of character selection are improved. FIG. 3 illustrates a method of displaying a character selection area for user input in accordance with one embodiment. The method comprises a number of operations described below.

At S101, one or more original characters entered by a user are received, and a character entry area via which the one or more original characters are entered by the user is determined.

The user can use any suitable input device, e.g., a keyboard, to enter the one or more original characters. After the one or more original characters are entered by the user, the method determines the position of the character entry area displayed on a display interface, e.g., a display panel or screen. Any of the existing technologies may be used to determine the parameters of the position of the character entry area, such as the position coordinates.

Figure 4:
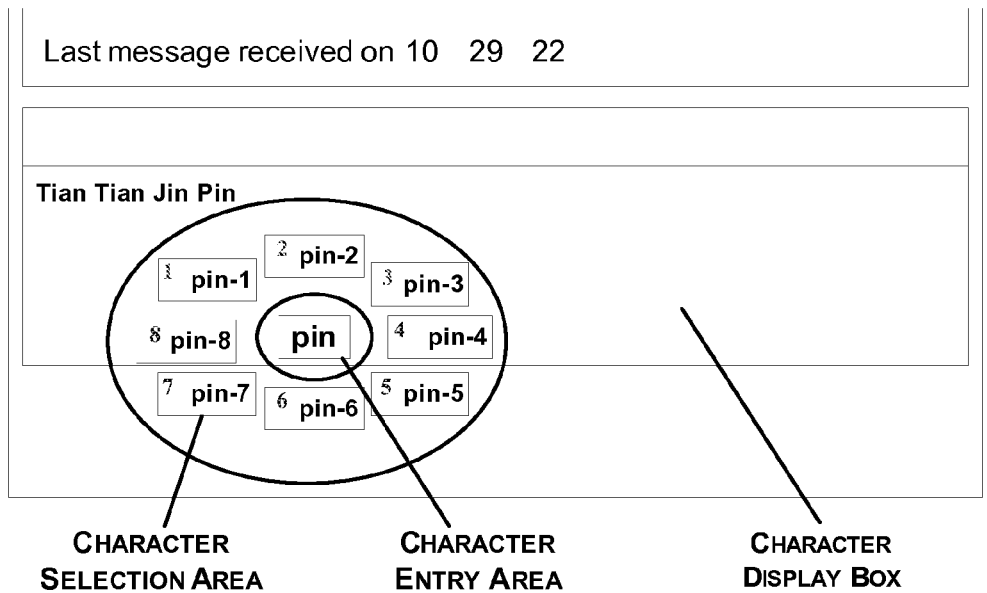
FIG. 4 shows a character selection area displayed on a display interface according to an embodiment of the present disclosure.

FIG. 4 illustrates a character selection area displayed on a display interface according to an embodiment of the present disclosure. Here, the area used to display the original characters "pin" entered by the user is the character entry area.

At S102, the method identifies a plurality of character choices that correspond to the one or more original characters entered by the user.

In one embodiment, the method searches a character database for characters related to the one or more original characters entered by the user, based on correlation between the characters stored in the character database and the user-entered one or more original characters, to identify a plurality of character choices for the user to choose from.

Following the above example, when the user enters "pin", the method searches the character database to identify a set of related character choices such as: pin-1, pin-2, pin-3, pin-4, pin-5, pin-6, pin-7, pin-8, pin-9, pin-10, pin-11 (note: each of these Chinese characters is pronounced as "pin" in Mandarin Chinese but the meaning of which is different from that of one another).

Another example is that, when the user enters "pinyin", the method searches the character database to identify a set of related character choices which may include the following: pinyin, pin-1, pin-2, pin-3, pin-4, pin-5, pin-6, pin-7, pin-8, pin-9, pin-10, pin-11 and the like (note: the first character choice is a term that is pronounced as "pinyin" in Mandarin Chinese, and the remaining character choices are pronounced as "pin" in Mandarin Chinese with the meaning of each being different from that of one another).

At S103, using the determined character entry area as a center point of an optimal viewpoint for the human eye, the method determines a character selection area for displaying the character choices for the user to choose from.

In general, a clear line of sight of the human eye is approximately within a space defined by a horizontal 35° angle and a vertical 20° angle from the center of a viewpoint. This space is an inverted pyramid-shaped space where the light within this space will be projected onto the retina of a viewer and transmitted to the brain of the viewer. In other words, objects displayed within this space require no movement or sweeping of the eye in order for the image to be projected onto the retina of the viewer. This space of clear line of sight can be referred to as the viewpoint range of the human eye. However, it is only within a small portion of this range near the center of the viewpoint area that displayed characters can be accurately distinguished. This smaller portion of the viewpoint range is considered the optimal viewpoint range.

In one embodiment, based on the optimal viewpoint range, the method determines the area on a display interface where the character selection will be displayed, using the character entry area as the center of viewpoint of the optimal viewpoint range. Within this range, the character selection area displays the character choices. In one embodiment, based on the position of the character entry area within the optimal viewpoint range, the method determines a ring-shaped area surrounding the character entry area. This ring-shaped area is used as the character selection area to display the character choices that are arranged in a ring-shaped fashion.

In determining the character selection area, the size of the ring-shaped area surrounding the character entry area may be determined using an expansion value. The expansion value may be set by a user directly. Preferably, the expansion value may also be set based on a number, a size, or the number and size of character choices to be displayed in the character selection area such that the size of the character selection area corresponds to the number, size, or number and size of the character choices.

During the user input process, the user's attention is typically focused on the character entry area. After character entry, the line of sight of the user typically moves to focus on the character selection area. The displayed character choices are scanned by the user's eye. Given that the distance, and hence movement of the eye, between the character entry area and the character selection area is small, the user's eye can quickly glance over the rest of the character choices. Thus, this technique effectively lessens the amount of movement of the eye, reduces fatigue, and increases the speed of the character selection process.

For instance, as shown in FIG. 4, an oval-shaped character selection area surrounds the user-entered original characters "pin".

In one embodiment, the abovementioned operations S102 and S103 may be implemented simultaneously. In other embodiments, they are not implemented simultaneously.

At S104, the character choices are arranged in accordance with a predetermined rule and displayed accordingly in the character selection area for selection by the user.

After determining the character choices and the character selection area, the method may further determine how to display the character choices within the character selection area based on the number of characters displayable in the character selection area and the number of character choices. In one embodiment, this may be achieved in the manner described below.

First, the number of characters displayable in the character selection area and the number of character choices are compared. In the case that the number of character choices to be displayed is no greater than the number of characters displayable in the character selection area, the character choices are displayed in a predetermined order in the character selection area for the user to choose from. However, when the number of character choices to be displayed is greater than the number of characters displayable in the character selection area, the character choices are displayed in a predetermined order in multiple pages depending on how many characters can be displayed in the character selection area.

The order in which the character choices are displayed may be determined randomly. Preferably, the order in which the character choices are displayed may be based on priority according to the frequency of usage of each of the character choices. In one embodiment, the display of the character choices may be based on the priority levels of the character choices in an order from the highest usage frequency to the lowest. When display of character choices on multiple pages is necessary, the character choices may be displayed in the order as described above on multiple pages according to the number of characters displayable in the character selection area and a user-entered command to go from one page to another.

As an illustration, the character selection area initially displays those character choices with the highest priority levels. On the user's command, the character selection area will display other character choices with lower priority levels. Generally, when the user inputs a turn-page command, the character selection area displays the character choices with lower priority levels than those of the character choices previously displayed.

Figure 5:
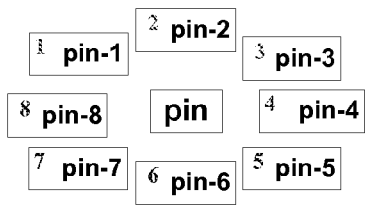
FIG. 5 shows an arrangement of characters in the character selection area according to an embodiment of the present disclosure.

For instance, FIG. 5 illustrates an oval-shaped character selection area that displays a set of character choices. FIG. 5 also illustrates the display of the character choices in a ring-shaped arrangement, in the order of "1: pin-1, 2: pin-2, 3: pin-3, 4: pin-4, 5: pin-4, 6: pin-6, 7: pin-7, 8: pin-8".

Figure 6:
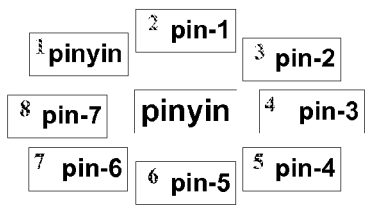
FIG. 6 shows another arrangement of characters in the character selection area according to an embodiment of the present disclosure.

As another example, FIG. 6 illustrates another oval-shaped character selection area that displays another set of character choices. FIG. 6 also illustrates the display of the character choices in a ring-shaped arrangement, in the order of "1: pinyin, 2: pin-1, 3: pin-2, 4: pin-3, 5: pin-4, 6: pin-5, 7: pin-6, 8: pin-7". The displayed character selection area of FIG. 6 is different than that shown in FIG. 5.

In arranging characters in the character selection area, the position of a character input point near the character entry area is preferably arranged as the starting point for displaying the character choices to make it convenient for the user to first see the character choices with the highest priority level. Furthermore, in one embodiment, different color tones may be used to indicate differences in priority level of the character choices and/or relevance of the character choices to the one or more original characters. For example, a warm color tone may be used for character choices with higher priority level and/or relevance while a cold color tone may be used for character choices with lower priority level and/or relevance.

At S103, the optimal viewpoint range of the human eye varies from person to person, and is related to factors such as one's visual point of view and the distance between the pupils. In one embodiment, the optimal viewpoint range may be determined based on experience or statistics. For instance, one may assume the optimal viewpoint range to be a range having the user input area as the center and within 10° horizontal and 10° vertical viewpoint lines from the center. This range is regarded as the keen vision area, or the center field of vision, within which the human eye is best able to discern differences in colors and details in images.

When determining the character selection area, the optimal viewpoint range and the distance between the user's eye and a display screen can be considered. Given the differences in equipment and distance between the user's eye and a display screen, a suitable predetermined distance may be adopted for computation to obtain the character selection area.

Preferably, one of a plurality of alternative distances may be chosen by a user based on the user's personal visual habit. Then, computation using the user-chosen distance is carried out to determine the character selection area.

In other words, the distance between the human eye and the display screen can be either a predetermined distance or chosen by the user from a plurality of alternative distances.

For instance, the expansion value of the character selection area may be obtained through the following formula:

$$C = \tan A * B;$$

Here, A is the optimal viewpoint range;
B is the distance between the human eye and the display screen;
C is the expansion value of the character selection area.

The character entry area can be the center of the character selection area which surrounds the character entry area in a ringed fashion and adopts an outer boundary that is round, oval, square, rectangular, or another shape based on the calculated expansion value.

Figure 7:
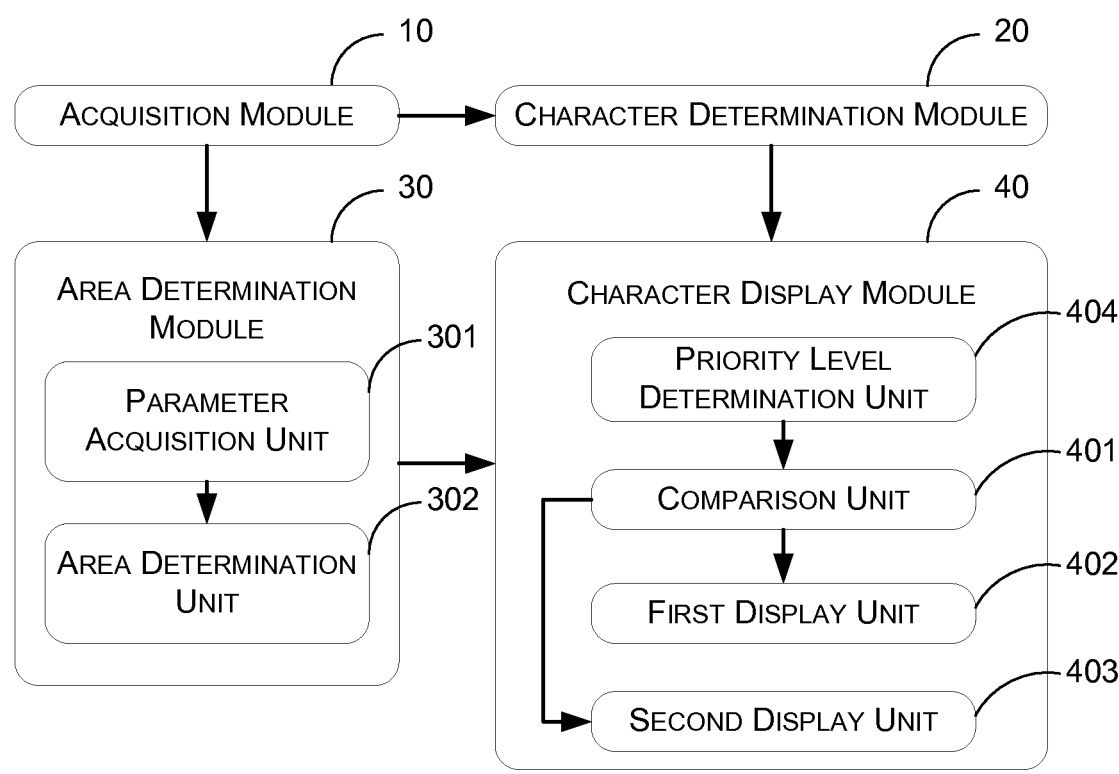
FIG. 7 shows a schematic diagram of an apparatus that displays character selection for user input according to an embodiment of the present disclosure.

The present exemplary disclosure further provides an apparatus for displaying character selection during a user input process, as illustrated in FIG. 7. The apparatus comprises: an acquisition module 10, a character determination module 20, an area determination module 30, and a character display module 40.

The acquisition module 10 receives one or more original characters entered by the user and determines a character entry area where the user enters the one or more original characters.

The character determination module 20 identifies character choices corresponding to the one or more original characters entered by the user.

The area determination module 30 determines a character display area for displaying the character choices identified by the character determination module 20 for the user to choose from, using the determined character entry area as a center point of an optimal viewpoint for the human eye.

Preferably, the area determination module 30 comprising: a parameter acquisition unit 301 and an area determination unit 302.

The parameter acquisition unit 301 obtains information related to the position of the character entry area determined by the acquisition module 10. The information related to the position of the character entry area includes: the center coordinates and radius of the character entry area or the center coordinates and boundary information of the character entry area.

The area determination unit 302, using the information related to the position of the character entry area, determines the character selection area with the character entry area as the center for optimal viewpoint for the human eye, and determines the expansion value to form the character selection area surrounding the character entry area.

The character display module 40, according to a predetermined rule for character arrangement, displays the character choices determined by the character determination module 20 in the character selection area.

Preferably, the character display module 40 comprises: a comparison unit 401, a first display unit 402 and a second display unit 403.

The comparison unit 401 compares the number of characters displayable in the character selection area and the number of the character choices to be displayed.

The first display unit 402 displays all the character choices according to a predetermined order in the event that the number of the character choices to be displayed is no greater than the number of characters displayable in the character selection area.

The second display unit 403 displays the character choices on a plurality of pages in a predetermined order, according to the number of characters displayable in the character selection area, in the event that the number of the character choices to be displayed is greater than the number of characters displayable in the character selection area.

Preferably, the character display module 40 may further comprise a priority level determination unit 404 that determines the respective priority level of each character choice based on how often each character choice is used, and notifies the first display unit 402 or the second display unit 403. Accordingly, the display unit 402 or the second display unit 403 displays the character choices based on the priority levels of the character choices.

The present disclosure describes various embodiments in the forms of a method, an apparatus and computer process flowchart. One of ordinary skill in the art can one utilize a computer program in a general-purpose computer, special-purpose computer, embedded processor or other programmable data processing equipment to execute computer program commands to implement the disclosed method or the disclosed apparatus capable of executing one or more operations depicted in the flowchart.

These computer program commands can also be placed on computers or other programmable equipment to execute a series of operating procedures to realize computer implementation. Thus, the implementation of the commands provides the capability to execute one or multiple operations of the flowchart.

The present disclosure discloses a method and apparatus for displaying a character selection area during a user input process. The size of the display area and the optimal viewpoint range determine the character selection area. The character choices are displayed within the optimal viewpoint range the center of which is the character entry area used by the user to enter one or more original characters. This is in accordance with the physiological function of the human eye regarding the longitudinal and horizontal appearance of the character selection area. The disclosed technique lessens the distance and frequency of movement of the human eye and thereby increases the selection speed and efficiency. Since the process of character selection is the most energy and time consuming step in character entry process, this technique will enable the user to increase the character entry speed and efficiency.

Preferably, a point near the character entry point of the character entry area can be used as a starting point for the arrangement of the character choices displayed in different color tones. This is to guide the line of sight of the user to fall on those character choices with higher priority level and/or relevance. Thus, the selection process is optimized.

The abovementioned is a concrete implementation of various embodiments of the present disclosure but is not to be limited as such. A person of ordinary skill in the art can easily modify, replace or use other implementations similar to the disclosure but such variations still fall within the scope of protection of this disclosure.

What is claimed is:

1. A method comprising:
under a control of one or more processors, determining a character entry area;
receiving one or more original characters with a plurality of different meanings in a language via the character entry area;
identifying a plurality of character choices with selective ones of the different meanings corresponding to the one or more original characters;
determining a character selection area surrounding the character entry area and the one or more original characters in the character entry area using an expansion value, wherein the expansion value is determined based on an optimal viewpoint range and a distance between a human eye and a display screen; and
displaying the plurality of character choices in the character selection area, wherein the character entry area is located within a boundary of the character selection area.

2. The method as recited in claim 1, wherein the determining the character entry area comprises:
upon receiving the one or more original characters, determining position parameters of the character entry area.

3. The method as recited in claim 2, further comprising:
based on the position parameters of the character entry area, determining an optimal viewpoint range that is centered around the character entry area; and
within the optimal viewpoint range, determining that the character selection area surrounds the character entry area.

4. The method as recited in claim 2, wherein the position parameters of the character entry area comprise: at least one of center coordinates and radius of the character entry area, or the center coordinates and boundary information of the character entry area.

5. The method as recited in claim 1, wherein the expansion value is further based on a number, a size, or the number and size of the plurality of character choices to be displayed in the character selection area to cause the size of the character selection area to correspond to the number, size, or number and size of the plurality of character choices.

6. The method as recited in claim 1, wherein the identifying the plurality of character choices comprises:
searching a character database for characters related to the one or more original characters that are user-entered; and
based on correlation between characters stored in the character database and the one or more original characters, identifying the plurality of character choices.

7. The method as recited in claim 1, wherein the displaying comprises:
comparing a number of characters displayable in the character selection area and a number of character choices to be displayed;
in an event that the number of the plurality of character choices to be displayed is no greater than the number of characters displayable in the character selection area, displaying the plurality of character choices in a predetermined order in the character selection area; and
in an event that the number of the plurality of character choices to be displayed is greater than the number of characters displayable in the character selection area, displaying the plurality of character choices in the predetermined order in a plurality of pages depending on the number of characters displayable in the character selection area.

8. The method as recited in claim 1, wherein the displaying comprises:
displaying the plurality of character choices in an order based on a priority level according to a frequency of usage of each character choice, wherein the character selection area includes a ring shape.

9. The method as recited in claim 1, wherein the displaying comprises:
displaying the plurality of character choices in different color tones to indicate differences in priority level of the plurality of character choices, relevance of the plurality of character choices to the one or more original characters, or both differences in priority level of the plurality of character choices and relevance of the plurality of character choices to the one or more original characters.

10. The method as recited in claim 9, wherein a point near a character entry point of the character entry area is usable as a starting point for an arrangement of the plurality of character choices displayed in different color tones.

11. The method as recited in claim 1, wherein the character selection area includes a vertical extent equaling less than twice the product of an approximated orthogonal distance between a human eye and a display screen multiplied by a trigonometric tangent of ten degrees and a horizontal extent equaling less than twice the product of the distance multiplied by a trigonometric tangent of seventeen and a half degrees approximately concentric with the character entry area.

12. An apparatus comprising:
one or more processors configured with computer-executable instructions to implement operations at multiple modules, the multiple modules including:
an acquisition module operable to receive one or more original characters with a plurality of different meanings in a language and operable to determine a character entry area for displaying the one or more original characters that are user-entered;
a character determination module operable to identify one or more character choices with selective ones of the different meanings corresponding to the one or more original characters;
an area determination module operable to determine a character selection area surrounding the character entry area, the character entry area being within boundary of the character selection area, and determine a character selection area surrounding the character entry area and the one or more original characters in the character entry area using an expansion value, wherein the expansion value is determined based on an optimal viewpoint range and a distance between a human eye and a display screen; and
a character display module operable to display the one or more character choices in the character selection area while the one or more original characters are displayed in the character entry area.

13. The apparatus as recited in claim 12, wherein the character display module comprises:
a comparison unit operable to compare a number of characters displayable in the character selection area and a number of the one or more character choices to be displayed;
a first display unit operable to display the one or more character choices according to a predetermined order in an event that the number of the one or more character choices to be displayed is no greater than the number of characters displayable in the character selection area; and
a second display unit operable to display the one or more character choices on a plurality of pages in the predetermined order, according to the number of characters displayable in the character selection area, in an event that the number of the one or more character choices to be displayed is greater than the number of characters displayable in the character selection area.

14. The apparatus as recited in claim 13, wherein the character display module further comprises:
a priority level determination unit operable to determine a respective priority level of each character choice based on how often each character choice is used, and operable to notify the first display unit or the second display unit to cause the first display unit or the second display unit to display the one or more character choices based on the priority levels of the character choices.

15. The apparatus as recited in claim 12, wherein the area determination module comprises:
a parameter acquisition unit operable to obtain information related to a position of the character entry area, the information related to the position of the character entry area including: center coordinates and radius of the character entry area, or the center coordinates and boundary information of the character entry area.

16. The apparatus as recited in claim 12, wherein the expansion value is determined based on an optimal viewpoint range and a distance between the human eye and a display screen, the distance being a predetermined distance or one of a plurality of alternative distances chosen by the user, wherein the character selection area includes a ring shape.

17. The apparatus as recited in claim 12, wherein the expansion value is based on a number, a size, or the number and size of the one or more character choices to be displayed in the character selection area to cause the size of the character selection area to correspond to the number, size, or number and size of the one or more character choices.

18. The method as recited in claim 12, wherein the character selection area includes a vertical extent equaling less than twice the product of an approximated orthogonal distance between a human eye and a display screen multiplied by a trigonometric tangent of ten degrees and a horizontal extent equaling less than twice the product of the distance multiplied by a trigonometric tangent of seventeen and a half degrees approximately concentric with the character entry area.

19. A method comprising:
under a control of one or more processors, determining a character entry area;
receiving one or more original characters with a plurality of different meanings in a language via the character entry area;
identifying a plurality of character choices with selective ones of the different meanings corresponding to the one or more original characters;
determining a character selection area having a vertical extent equaling less than twice the product of an approximated orthogonal distance between a human eye and a display screen multiplied by a trigonometric tangent of ten degrees and a horizontal extent equaling less than twice the product of the distance multiplied by a trigonometric tangent of seventeen and a half degrees approximately concentric with the character entry area; and
displaying the plurality of character choices in the character selection area, the character entry area being within a boundary of the character selection area.

20. The method as recited in claim 19, wherein the boundary is oval-shaped.

* * * * *